Oct. 26, 1926. 1,604,519

L. D. KELLOGG

CONTROL SYSTEM

Filed Nov. 9, 1921

Inventor:
Leroy D. Kellogg
By Curtis & Camp.
Attorney.

Patented Oct. 26, 1926.

1,604,519

UNITED STATES PATENT OFFICE.

LEROY D. KELLOGG, OF DEERFIELD, ILLINOIS, ASSIGNOR TO KELLOGG SWITCHBOARD AND SUPPLY COMPANY, OF CHICAGO, ILLINOIS, A CORPORATION OF ILLINOIS.

CONTROL SYSTEM.

Application filed November 9, 1921. Serial No. 513,942.

My invention relates to control systems and has to do more particularly with a combined pressure supply and storage battery charging system for automatically maintaining a pressure within certain predetermined limits, and for also maintaining the voltage of the storage batteries within certain predetermined limits, and an object of my invention is to provide a control system of the above type, which is simple in construction and positive and most efficient in its operation.

As an instance of the uses to which the nvention may be applied, a water system used for supplying water in a home where there is no centralized water system may be considered. Such a system usually comprises a pump which is driven by suitable means, a compression tank and an automatic control which starts and stops the driving power when the pressure used for the system rises or falls beyond predetermined limits. A typical storage battery charging outfit may comprise a gas engine which has directly connected thereto a generator driven by the gas engine to generate current to charge the storage batteries. Such an electrical charging system is also usually provided with an automatic control which stops the gas engine when the voltage of the storage batteries reaches a predetermined limit.

My invention is particularly directed to systems of these types, and a feature of my invention is the provision of means for connecting the gas engine or other primary power source of a battery charging system with an air supply for pumping, or other system operated from pressure in such a way that the pressure is automatically kept up by power received directly from the gas engine through the agency of a suitable pump or other means. When the pressure in the air tank, for example, reaches a predetermined point, the storage battery of the electrical system may be automatically cut in and will continue to receive a charging current until its charge reaches a predetermined point, when the gas engine will be automatically stopped.

Figure 2:
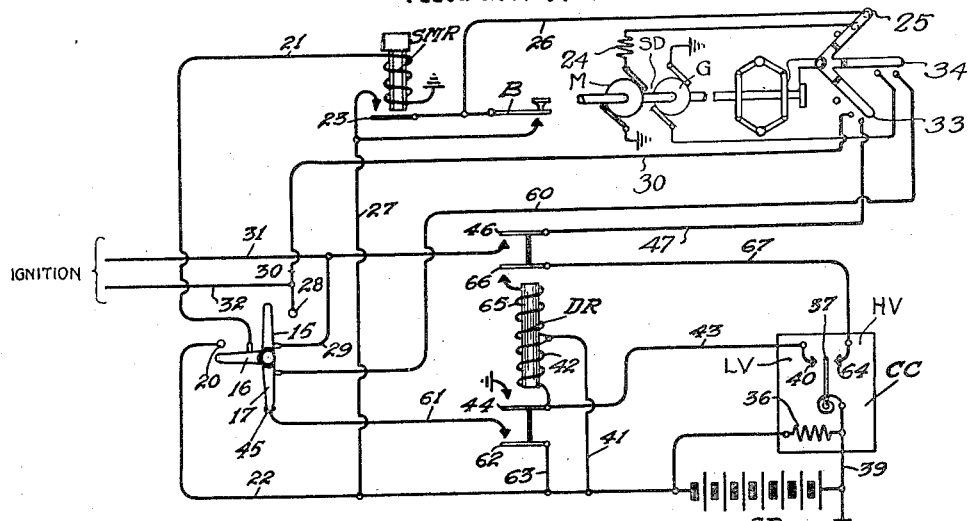
Figure 1:
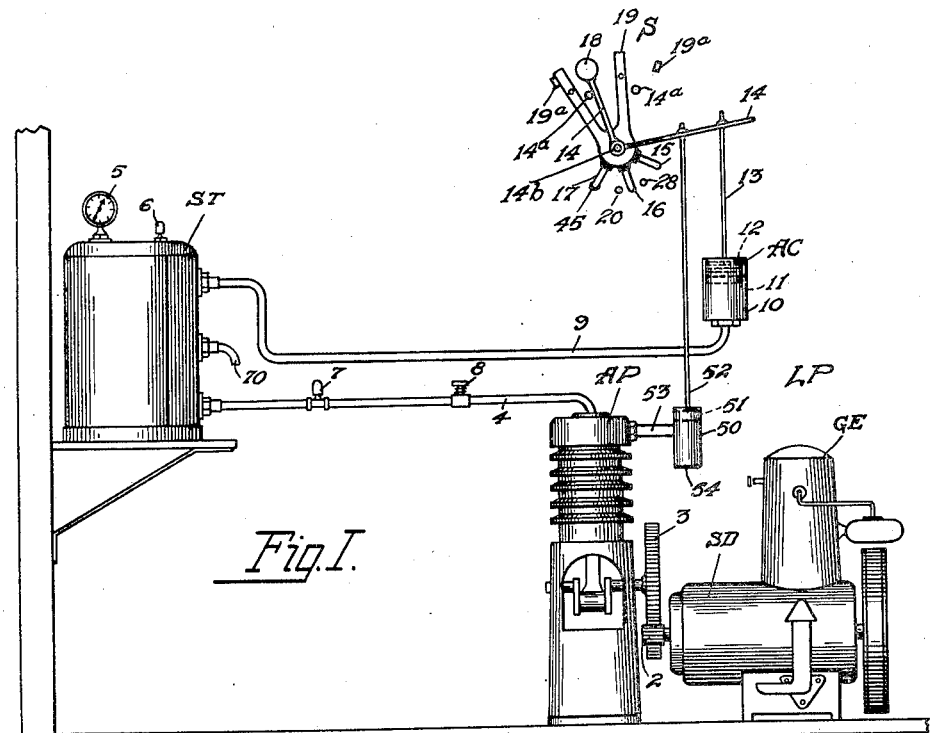

Further features of my invention not specifically referred to above will appear in the detailed description and appended claims, and the other advantageous results which are attained will be described by reference to the accompanying drawing, wherein Fig. 1 illustrates my system in a more or less diagrammatic way, and Fig. 2 illustrates a diagram of the circuits associated therewith.

Referring now in general to my invention as illustrated, and referring particularly to Fig. 1, I illustrate my system in a more or less diagrammatic way. At LP I illustrate a typical charging outfit, comprising a combined starting motor and generator SD directly connected to a gas engine GE.

To the left of LP I illustrate an air pump AP of any approved type, and this is directly connected to the gas engine shaft through the medium of a suitable pinion 2 on the shaft of the engine and a gear wheel 3 on the shaft of the air pump. In reference to the combined starting motor and generator SD, when the starting circuit of the motor is closed to battery, the combined motor and generator rotates to turn over the gas engine, and as the latter's ignition circuit is also closed, the gas engine starts running to operate the air pump and also rotate the charging generator. A supply tank ST is provided for storing the compressed air for use in the water or other system, and a pipe line 4 connects the supply tank ST with the air pump AP. A suitable pressure gauge 5 is connected to the tank ST, as is also a safety valve 6. A check valve 7 is connected in the pipe line 4, for the usual purposes, and I also show a pressure relief valve 8 which permits the air to escape from the pipe line 4, when the pump AP first starts to operate and remains open until the pump and engine have reached speed, when it is closed by means of the air pressure, thereby reducing the work on the gas engine until the same has reached its full speed.

An automatic pressure control AC is provided which is connected with the supply tank ST through the medium of a pipe line 9 so that the pressure may be controlled to start and stop the gas engine when the pressure falls or rises beyond a predetermined point. The control AC may be of any approved type, and for the purpose of illustration, I show a simple one comprising an air chamber or cylinder 10 provided with a plunger or piston 11 and a coil spring 12. When the pressure in the supply tank ST is at its predetermined maximum point, the piston 11 is forced upward against the tension of the spring 12. Now, when the pressure in the tank drops to its predetermined minimum point, the spring 12 forces the piston 11 down against the pressure in the pipe line 9. The piston 11 has secured thereto a connecting link or rod 13 which in turn is connected to an automatic switch S of any approved type, for purposes as will presently be described.

The water pressure system may be a pneumatic system, a supply pipe 70 leading from the supply or pressure tank into a well or other source of water supply and connected to a pump device operated by means of compressed air supplied from the supply tank ST through the pipe 70; or the system may be of the hydro-pneumatic type in which a water pump is operated by the gas engine, which will pump water into a supply tank, air also being supplied. When the proper pressure is reached, the power will be shut off automatically through the agency of the pressure control and cut on again when the pressure is reduced. Various systems of the nature indicated are well known in the art.

Referring to Fig. 2, I illustrate a circuit diagram associated with the control system for controlling the starting and stopping of the engine for driving the air pump AP of the water system and for controlling the operation of the gas engine to permit the generator to be operated to charge the storage batteries should the voltage of the storage batteries fall below their predetermined minimum point.

Having described in general the apparatus embodying my invention, I will now describe in detail the operation of the combined water and lighting system, as illustrated in Figs. 1 and 2.

Assuming now that the apparatus is in the condition as illustrated in Figs. 1 and 2, and further assuming that the pressure range of the water system is seventy-five pounds for a maximum and forty-five pounds for a minimum, and that the pressure in the water system has dropped down to its minimum limit of forty-five pounds, the spring 12 in the air chamber or cylinder 10 of the automatic pressure control AC overcomes the pressure in the pipe line 8 and forces the piston 11 down. The connecting rod 13 secured to the piston 11 is connected with angular arm 14 of the automatic switch S, said arm 14 carrying a weight 18 that the spring 12 has to move to beyond vertical, as well as to overcome the pressure in pipe 9. The apparatus is so proportioned and weighted that the weight 18 passes beyond vertical when the tank pressure is at, say forty-five pounds. Evidently, when it does pass vertical, weight 18 aids instead of resists spring 12, and 18 falls till it hits stop 14$^a$. In falling it strikes the pin on the right hand arm of the bifurcated switch member 19, and said member is thrown to the right until it hits stop 19$^a$, the member 19 pivoting freely on pin 14$^b$, which also supports arm 14. Member 19 carries contact makers 15, 16 and 17, which have now respectively engaged contact 28, engaged and passed beyond contact 20, and disengaged contact 45.

To throw the switch mechanism back to normal, the pressure in pipe 9 not only must overcome spring 12 but must move to the left beyond vertical weight 18. This only occurs when the air pressure is, say, seventy-five pounds. Then weight 18 aids the air pressure and moving to the left engages the pin on the left arm of 19 and throws the switch member 19 to the left to engage stop 19$^a$, member 14 stopping when it engages pin 14$^a$. When the pressure decreases to forty-five pounds the member 19 moves to the right and contact arm 16, operatively associated with passive contact 20 during part of its movement, engages the contact 20 to close an energizing circuit through the winding of the starting motor relay SMR, traced from ground through the winding of relay SMR, conductor 21, through the contact arm 16 of the switch S, the momentarily engaged contact 20, conductor 22 to the storage battery SB of the system to ground. The relay SMR upon energization closes its alternate contact 23, establishing an energizing circuit through the starting winding 24 of the combined motor generator SD of the system, traced from ground through the starting winding 24, closed contact 25 controlled by the generator SD, conductor 26, alternate contact 23 of relay SMR, conductors 27 and 22 to the storage battery SB to ground. Due to the slow-to-release construction of the relay SMR, the said relay is held energized for a short time after the contact arm 16 of the switch S has disengaged the contact 20, and the contact 23 of the relay SMR is thus held closed to maintain the circuit of the starting winding 24 closed to permit the same to turn over the gas engine GE a few times. The contact arm 15 of the switch S when moved, as before described, engages its associated contact 28 to close the ignition circuit of the gas engine GE over conductors 29, 30 and conductors 31, 32. As soon as the gas engine GE picks up and the generator SD is operating at full speed, the contact 25 which may be centrifugally controlled thereby is opened, and contacts 33 and 34, which are also controlled by the rotating generator SD, are closed for purposes as will now be described. As soon as relay SMR's armature retracts, winding 24 is disconnected. Thus, if for any reason the gas engine fails to pick up within the time that the slow release construction of SMR keeps its armature up, the battery will be saved from turning over indefinitely a gas engine that may be unstartable from lack of fuel or other cause.

Having assumed that the air pressure of the water system has dropped to its minimum predetermined point, and the switch has operated as already described, the air pump AP is now operated by the gas engine GE through the agency of the pinion 2 and gear 3. The pressure relief valve 8 in the pipe is now operated to be closed for purposes already described. When the pressure in the storage tank ST reaches its maximum predetermined limit, which we have assumed is seventy-five pounds, the automatic pressure control AC which is connected to the tank ST by the pipe line 9 is operated as already described, and the arm 14 of the switch S and the contacts 15, 16 and 17 are again shifted, but in the reverse direction to normal and to disengage and engage contacts to bring about circuit changes as will be presently described.

I provide a sensitive current control CC of any approved type, which is operatively associated with the storage batteries SB of the system and serves to aid in maintaining the voltage of the battery between predetermined limits. As long as the storage battery SB stays within its maximum and minimum limits, the pointer 37 of the current control CC remains in its intermediate position. A winding 36 associated with the current control CC is connected in circuit with the storage battery, and assuming now that the storage battery has dropped below its predetermined minimum voltage, the pointer 37 of the current control moves to the left which is the low voltage side LV of the current control CC, into engagement with the stationary contact 40, due to the decrease in current in winding 36 and closes an energizing circuit for the differential relay DR, traced from the storage battery SB, conductors 22 and 41, winding 42 of the relay DR, conductor 43, contact 40, pointer 37, to ground over conductor 39. The relay DR upon energization closes its alternate contact 44, establishing a locking circuit for itself traced from battery SB, conductors 22 and 41, winding 42 of relay DR to ground at alternate contact 44 of relay DR. As just described, the pressure of the water system has, through the agency of the automatic pressure control AC, again operated the switch S to cause arm 15 to disengage contact 28 and cause contact arm 17 to engage contact 45. The opening of the connection between contact 28 and the contact arm 15 opens the ignition circuit of the gas engine GE, but due to the energization of relay DR, as just described, its alternate contact 46 is closed, closing a substitute path for the ignition current for the gas engine GE, traced from conductor 31, through alternate contact 46 of relay DR, conductor 47, closed contact 33, which contact is under the control of the rotating generator SD, conductor 30 to conductor 32. The gas engine GE continues to run and as the air pump AP is directly connected to the gas engine GE, the said pump AP is still operating but under no load while engine GE is charging the storage batteries. To this end, I connect a valve 50 to air pump AP, said valve provided with a plunger 51 and having one end open. A link connection 52 connects the arm 14 of the switch S with the piston or plunger 51, and when the switch S is operated by the movement of weight 18 to the right, as before described (when the pressure drops below its minimum limit), the plunger 51 is moved downward and closes the opening 53 of the air pump. Now that the pressure of the water system has reached its maximum limit and the switch S is shifted back, due to the link connection 52, the plunger 51 is again raised above the opening 53 and permits the air from the operating pump AP to escape through the open end 54 of the valve 50, the air pump thus operating under no pressure load while the battery charges. The contact 34 associated with the generator SD remains closed while the generator is running and charging current from the generator now flows from the generator SD through alternate contact 34, conductor 60, contact arm 17 and contact 45 of the switch S, conductor 61, alternate contact 62 of the relay DR, conductors 63 and 22 to the storage battery SB of the system. The storage battery SB continues to receive the charging current until it is charged to its maximum predetermined point, when the pointer 37 is moved to the right which is the high voltage side HV of the current control CC, into engagement with the contact 64 of the current control CC, due to the increased battery voltage increasing the current in winding 36. This engagement closes a circuit through the upper winding 65 of the relay DR, traced from battery SB over conductors 22 and 41, through the upper winding 65 of relay DR, alternate contact 66 of relay DR, conductor 67, contact 64, pointer 37, to ground over conductor 39. Due to the differential construction of relay DR, the said relay now de-energizes and restores, and upon the opening of its alternate contact 46 DR opens the ignition circuit of the gas engine GE to stop it, and rotation of the generator SD ceases. From the foregoing description, it may be seen than when the pressure of the water system drops below its minimum limit, the gas engine is automatically started to raise the pressure of the system to its maximum limit. Should the voltage of the storage batteries of the lighting system have dropped be'ow its minimum predetermined limit, the batteries will be cut in automatically and the gas engine GE will continue to run after the pressure of the water system has been raised to its maximum and continue to operate the generator to charge the storage batteries SB. When the maximum charge is received, the gas engine is automatically shut off.

If the gas engine has run and raised the pressure of the water system to its maximum, and if the charge of the storage battery SB be between its maximum and minimum limits when switch S is thrown to the left, the pointer 37 of the current control CC will be in its intermediate position, and when the contact arm 15 disengages the contact 28 it will open the ignition circuit of the gas engine GE. The relay DR will be in its normal de-energized condition in this instance, and as its alternate contact 46 is open no substitute ignition circuit is established for the gas engine and it stops.

It will be observed that the contact at 17—45 is open when the engine is being used for increasing the pneumatic or other pressure. Consequently, the generator SD is always rotated under no-load condition when the engine is being used for pressure charging purposes, and, as has already been pointed out, when the gas engine is being used to turn the generator for actual charging, the pressure apparatus is under no-load conditions of operation because valve 50 is open.

If the invention is used for a domestic water supply and lighting system, in the usual course the water supply system pressure will cause the starting of the engine several times per day, as such systems are not usually of great capacity. Practically each time the water supply system has its pressure renewed, the engine is turned over running to the battery charging system, which accepts or rejects a charge according to its condition of charge.

In the ordinary course, the relay SMR will by its slow release armature serve to keep the motor SD running long enough to insure the starting of the gas engine provided the latter is properly supplied and is in good condition. Should the engine fail to start, the person in charge will have warning from the condition of the water supply that something is wrong and after he has attended to it, will close the hand-operated contact B to operate the starting motor.

While for convenience I have explained the invention in connection with a particular set of devices, it is apparent that its application is not limited to them, and in the appended claims I shall claim the invention in general terms.

Having described my invention what I claim as new and desire to secure by Letters Patent is:

1. A pressure charging system and a battery charging system, said systems having a common primary charging power, apparatus including a slow acting relay controlled by the one system for starting the power into action and apparatus including a differential relay controlled by the other system for stopping the power.

2. A pressure system and a battery charging system including a primary source of power common to both automatically rendered effective by reduction of pressure in the pressure system, and apparatus jointly controlled by said systems to continue said power effective until said pressure is increased to a predetermined point and for then discontinuing said power if said battery has a predetermined charge, and means including a differential relay adapted to continue said power effective if the charge of said battery has fallen below a predetermined point until the charge of said battery reaches a predetermined point.

3. A gas engine and an associated electrical motor for starting it, a pressure charging system and a battery charging system associated therewith, means controlled by said pressure control system for closing a circuit to operate the motor, a relay having a slow release armature, a contact maintained closed by said armature in the circuit of said motor, said relay energized responsive to said means controlled by said pressure system, a differential relay having a pair of windings and terminals therefor for stopping said gas engine, a battery having one of its terminals connected to each of the windings of said relay, and a current control device controlled by said battery charging system for connecting the other terminal of said battery to one of the windings of said differential relay to maintain the operation of said gas engine or to the other winding of said relay for stopping said gas engine.

4. A combined pressure and battery charging system, including an internal combustion engine, an automatic switch actuated in one way when pressure is reduced and in another when it is increased, means including a slow acting relay controlled by said switch for starting the engine to increase the pressure charge, said switch also serving to stop the engine when the pressure is increased, and a switch device having a differential relay operatively associated therewith controlled by the battery charging system to prevent such stoppage.

5. A mechanical charging system and a battery charging system, said systems having a common source of charging power, said source automatically rendered active by a reduction of pressure in one of said systems, and automatically rendered inactive only when the pressures in both systems are at predetermined levels, automatic apparatus for placing the battery charging system on no load when the mechanical pressure system is being charged and for placing the mechanical pressure charging system on no load when the battery pressure is being increased.

6. A pressure charging system and a battery charging system, said systems having a primary charging power, apparatus controlled by the pressure system for starting the charging power into action, said apparatus also being adapted to discontinue said power under a predetermined condition, and apparatus including a differential relay controlled by the battery charging system for continuing the charging power in action and for thereafter stopping the application of the charging power.

7. A charging system including a pressure tank and a gas engine and associated charging means for increasing the pressure, an electrical self-starter for said engine, automatically effective when the pressure is reduced, means automatically actuated by an increase of pressure in said tank to render said means ineffective to charge said tank while said gas engine operates, an electric storage battery and a charging system therefor, said gas engine furnishing power to charge said battery after said means are rendered ineffective, said battery charging system including means for stopping said engine.

8. A system of the character described including a pressure charging system and an electrical battery charging system, a common source of power for charging both systems, automatic means including a slow acting relay controlled by said pressure charging system for rendering said power active under one predetermined condition, said pressure charging system also controlling said automatic means to render said power inactive under another predetermined condition, and a differential relay including a circuit closer controlled by said battery charging system for continuing said power active, said differential relay and said circuit closer thereafter stopping the application of the charging power to said battery system.

9. A pressure charging system and an electrical battery charging system, a motor common to said systems for charging them, automatic means, for starting and stopping said motor jointly controlled by said systems, an automatic device placing the pressure system on no load when the battery is charging, and an automatic device placing the battery charging system on no load when the pressure system is charging.

10. A pressure charging system and a battery charging system, a motor common to said systems, automatic means placing the pressure charging system on no load when the battery is charging, and for placing the battery charging system on no load when the pressure system is charging, and automatic means jointly controlled by the systems for starting and stopping the motor.

11. A control system of the character described comprising a combined water supply and storage battery light system, a combined starting generator and gas engine for said lighting system and a pump for said water supply system directly connected to said gas engine, a pressure control for said water supply for maintaining the pressure of said water supply within certain fixed limits, a switch operatively associated with said pressure control, a relay for said control system, a starting circuit for said gas engine, means controlled from said switch for operating said relay to close said starting circuit of said gas engine when the pressure of said water system falls below its fixed limit to raise the pressure thereof to its other fixed limit, and a sensitive circuit closer for said light system controlling means to maintain the ignition circuit of said engine closed should the voltage of said storage battery of the light system drop below its fixed limit.

12. A control system of the character described including a water supply system and a lighting system, a slow acting relay and a differential relay, a combined starting generator and gas engine for said light system and a pump for said water system operated by said engine, a pressure control for said water system, a switch connected with said pressure control, means for actuating said switch to energize said slow relay when the pressure of said water system falls below a fixed limit to close a starting circuit for said engine to operate said pump to raise the pressure of said water system to its other fixed limit, a sensitive circuit closer for said light system actuated when the voltage of said light system drops below a fixed limit to close a circuit of said differential relay to maintain the ignition circuit of said engine closed to permit the rotation of said generator to charge said storage battery to its other fixed limit, and means controlled by said battery for stopping said engine.

13. A control system of the character described comprising a water supply system and a lighting system, a slow acting relay and a differential relay, a combined starting generator and gas engine for said light system and a pump for said water system driven by said engine, a pressure control for said water system, a switch connected with said pressure control, connection means for actuating said switch when the pressure of said water system falls below a fixed limit to close a starting circuit for said engine to operate said pump to raise the pressure of said water system to its other fixed limit, and connection means again operating said switch when said other fixed limit is reached, a sensitive circuit closer for said light system actuated when the voltage of said light system drops below a fixed limit to close a circuit for said differential relay to maintain the ignition circuit of said engine closed to permit the rotation of said generator to charge said storage battery to its other fixed limit, and means thereon effective to close another circuit through said differential relay to de-energize the same and open the ignition circuit of said engine.

Signed by me at Chicago, in the county of Cook and State of Illinois, this 4th day of November, 1921.

LEROY D. KELLOGG.